United States Patent

Castle et al.

(10) Patent No.: US 8,561,668 B2
(45) Date of Patent: Oct. 22, 2013

(54) RAPID MANUFACTURING METHOD

(75) Inventors: Lea Kennard Castle, Vernon, CT (US); John Joseph Marcin, Marlborough, CT (US); Steven J. Bullied, Pomfret Center, CT (US); Mario P. Bochiecchio, Vernon, CT (US); Kevin W. Chittenden, Oxford, AL (US); Carl R. Verner, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/192,688

(22) Filed: Jul. 28, 2011

(65) Prior Publication Data

US 2013/0025810 A1    Jan. 31, 2013

(51) Int. Cl.
*B22C 9/00* (2006.01)
*B22C 9/10* (2006.01)

(52) U.S. Cl.
USPC ................ 164/4.1; 164/516; 164/28

(58) Field of Classification Search
USPC .............. 164/516–519, 28, 369, 72, 4.1
See application file for complete search history.

(56) References Cited

U.S. PATENT DOCUMENTS

| 4,575,330 | A | * | 3/1986 | Hull ............................ 425/174.4 |
| 4,844,144 | A | | 7/1989 | Murphy et al. |
| 5,234,636 | A | | 8/1993 | Hull et al. |
| 5,439,622 | A | | 8/1995 | Pennisi et al. |
| 5,641,448 | A | | 6/1997 | Yeung et al. |
| 5,658,506 | A | | 8/1997 | White et al. |
| 6,117,612 | A | | 9/2000 | Halloran et al. |
| 6,409,902 | B1 | | 6/2002 | Yang et al. |
| 6,513,567 | B2 | | 2/2003 | Collins et al. |
| 6,602,545 | B1 | | 8/2003 | Shaikh et al. |
| 2006/0110621 | A1 | * | 5/2006 | Brilmyer et al. .............. 428/689 |
| 2006/0118990 | A1 | | 6/2006 | Dierkes et al. |
| 2009/0250835 | A1 | | 10/2009 | Takase et al. |
| 2010/0122789 | A1 | * | 5/2010 | Piggush et al. ................. 164/28 |
| 2010/0304064 | A1 | * | 12/2010 | Huttner ........................ 428/35.8 |

FOREIGN PATENT DOCUMENTS

| DE | 19900597 A1 | 6/2000 |
| WO | 2007138619 A1 | 12/2007 |

OTHER PUBLICATIONS

Hull A: "Stereolithography as a Tool for Prototype Moulds," Kunststoffe Europe, Carl Hanser Verlag, Munchen, DE, No. 3/04, Dec. 1, 1991, pp. 334-337, XP000293448.

Extended European Search Report for Application No. EP 12 17 7680 dated Nov. 9, 2012.

* cited by examiner

*Primary Examiner* — Kevin P Kerns

(74) *Attorney, Agent, or Firm* — Carlson, Gaskey & Olds

(57) ABSTRACT

A rapid manufacturing method includes forming tooling in a rapid manufacturing process. The tooling is coated with a conductive material.

16 Claims, 6 Drawing Sheets

RAPID MANUFACTURING METHOD

BACKGROUND

This disclosure generally relates to a manufacturing method, and more particularly to a rapid manufacturing process for building tooling that can be used to manufacture casting articles for casting processes.

Gas turbine engines are widely used in aircraft propulsion, electric power generation, ship propulsion and pumps. Many gas turbine engine parts are manufactured in a casting process. Investment casting is one known casting process. Investment cast parts can include relatively complex geometries, such as gas turbine engine airfoils requiring internal cooling passages. Blades and vanes are examples of such parts.

Investment casting utilizes a plurality of casting articles, such as shells and cores, that function as a casting system for manufacturing a part. In general, the casting system is prepared having one or more cavities that define a shape generally corresponding to the part to be cast. In some cases, a wax pattern of the part is formed by molding wax over a core. In a shelling process, a shell is formed around one or more of the wax patterns. The wax is melted and removed. The shell is hardened in a firing process such that the casting system is formed, and in some cases the shell includes one or more part defining compartments that include the core.

Specialized tooling is used to manufacture the casting articles employed in the investment casting process. Such tooling is manufactured out of aluminum or steel using milling, high speed machining, electrical discharge machining (EDM), or similar technique(s). Typical lead times for manufacturing the tooling can range anywhere from 8 to 28 weeks or longer.

SUMMARY

A rapid manufacturing method includes forming tooling in a rapid manufacturing process. The tooling is coated with a conductive material.

In another exemplary embodiment, a rapid manufacturing method includes building tooling in a rapid manufacturing process. The tooling is coated with a metallic material. A casting article is manufactured with the tooling. The casting article is used in a casting process to cast a part.

The various features and advantages of this disclosure will become apparent to those skilled in the art from the following detailed description. The drawings that accompany the detailed description can be briefly described as follows.

DETAILED DESCRIPTION

Figure 1:
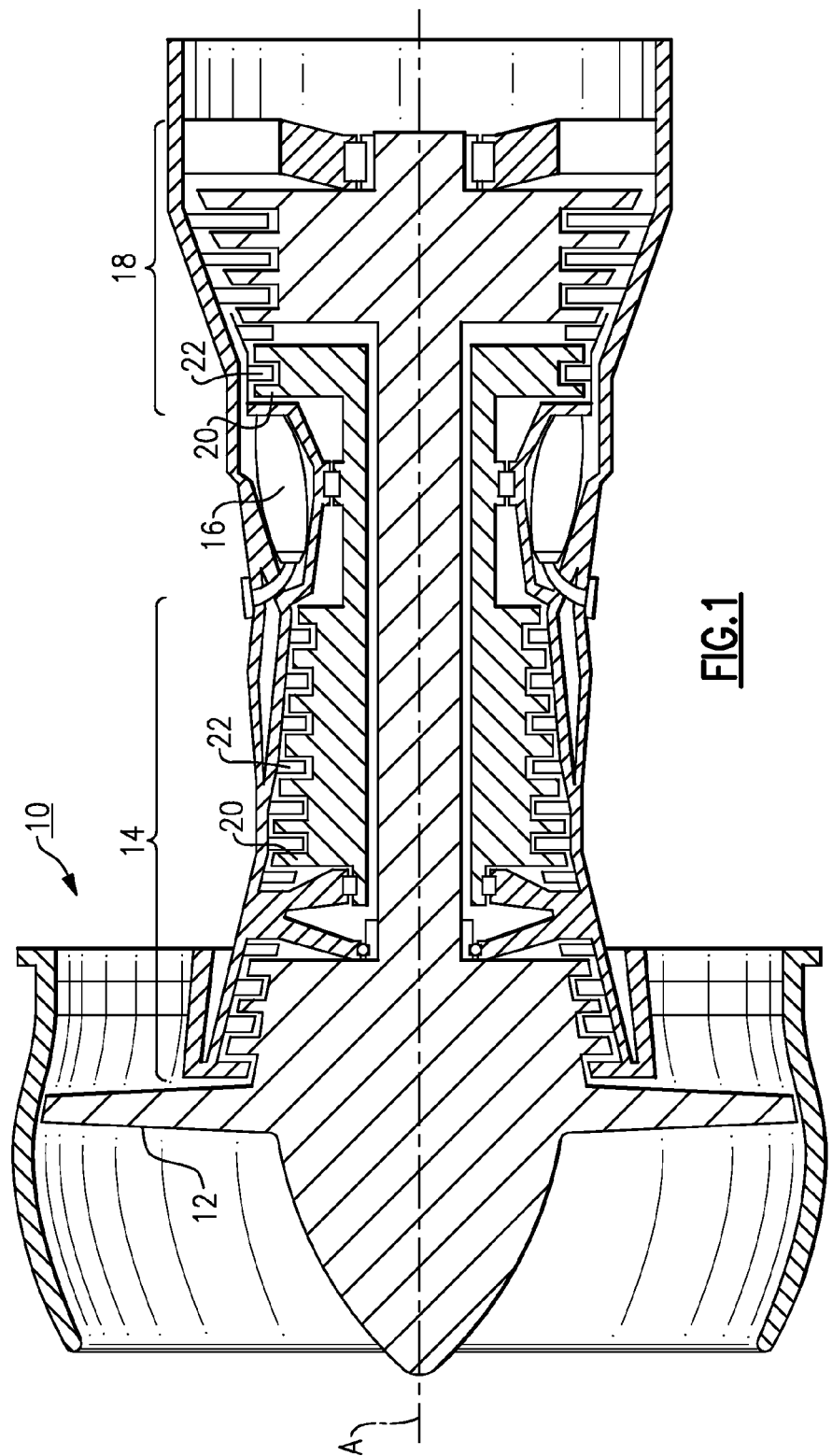
FIG. 1 illustrates a schematic view of a gas turbine engine.

FIG. 1 illustrates an example gas turbine engine 10 that is circumferentially disposed about an engine centerline axis A. The gas turbine engine 10 includes (in serial flow communication) a fan section 12, a compressor section 14, a combustor section 16 and a turbine section 18. During operation, air is compressed in the compressor section 14 and is mixed with fuel and burned in the combustor section 16. The combustion gases are discharged through the turbine section 18, which extracts energy from the combustion gases for powering the compressor section 14, the fan section 12, and other potential loads.

The gas turbine engine 10 includes a plurality of parts that can be manufactured in a casting process, such as an investment casting process or other suitable casting process. For example, both the compressor section 14 and the turbine section 18 include numerous airfoils, such as alternating rows of rotating blades 20 and stationary vanes 22, that can be cast.

This view is highly schematic and is included to provide a basic understanding of the gas turbine engine 10, and not to limit this disclosure. This disclosure extends to all types of gas turbine engines and for all types of applications.

Figure 2:
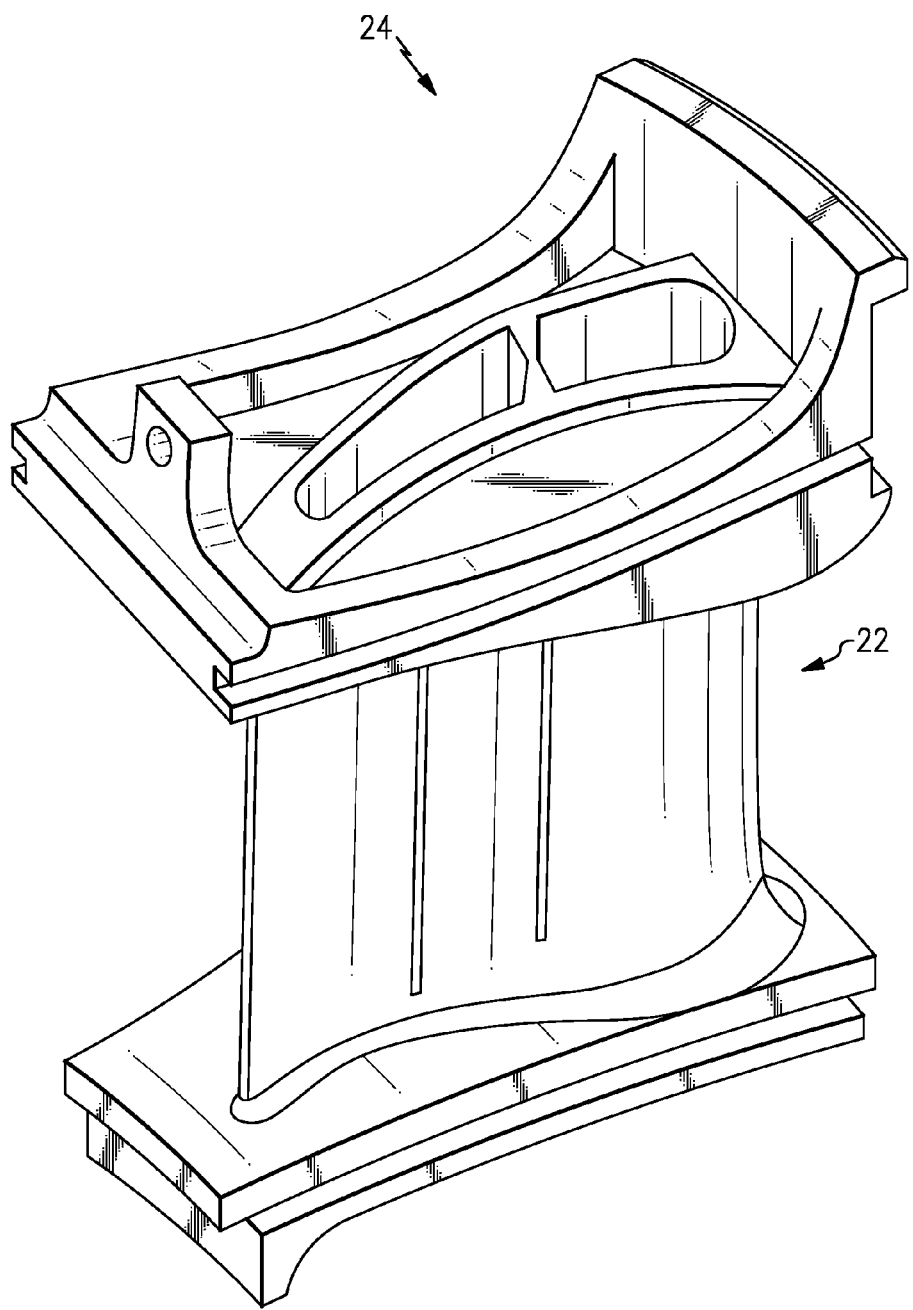
FIG. 2 illustrates a part that can be manufactured in a casting process.

FIG. 2 illustrates a part 24 that may be manufactured using a casting process. One example casting process is investment casting. In this example, the part 24 is a vane 22 of the turbine section 18. However, the various features and advantages of this disclosure are applicable to any cast part of the gas turbine engine, or any other part.

Figure 3:
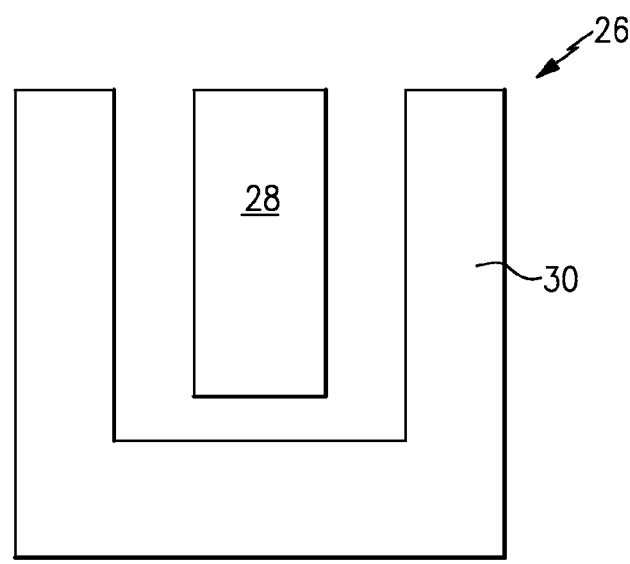
FIG. 3 illustrates a casting system.

FIG. 3 illustrates an example casting system 26 that can be used in a casting process to cast a part, including but not limited to, a part similar to the part 24 of FIG. 2. The casting system 26 includes a core 28 and a shell 30. The core 28 is positioned and spaced relative to the shell 30 in a known manner. The core 28 creates the internal features of the part, such as the cooling passages, for example. The shell 30 forms the external shape and features of the part.

In a casting process, a casting alloy is introduced into the casting system 26 to cast a part, such as by pouring, for example. Upon cooling and solidifying of the casting alloy, the part is removed from the casting system 26 as is known. Of course, this view is highly schematic and is included to provide a basic understanding of a casting system. The shape, placement and configuration of the core 28 and the shell 30 and any other casting articles of the casting system 26 will vary depending upon the type of part being cast.

Figure 4:
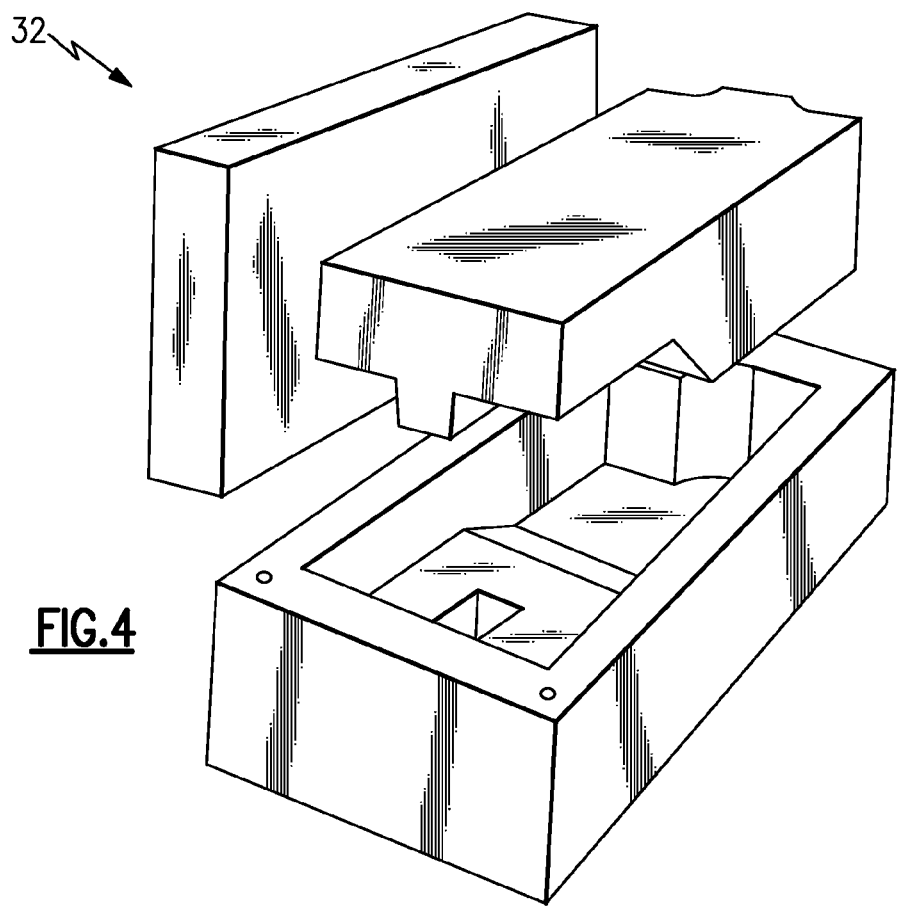
FIG. 4 illustrates tooling that can be used to manufacture a casting article for use in a casting process.

FIG. 4 illustrates an example of tooling 32 that can be used to build a casting article 34 for use in a casting process. The tooling 32 of FIG. 4 represents a die pattern, such as a die pattern for wax injection, ceramic core injection or any type of plastic injection molding. The tooling 32 is used to manufacture the casting articles that are necessary for conducting a casting process to manufacture a gas turbine engine part, such as part 24 described above, including but not limited to, the core 28, the shell 30 or any other associated casting article of a casting system. The tooling 32 (and therefore the casting article 34 made by the tooling 32) is built to the dimensional opposite of a part to be cast in a casting process.

Figure 5A:
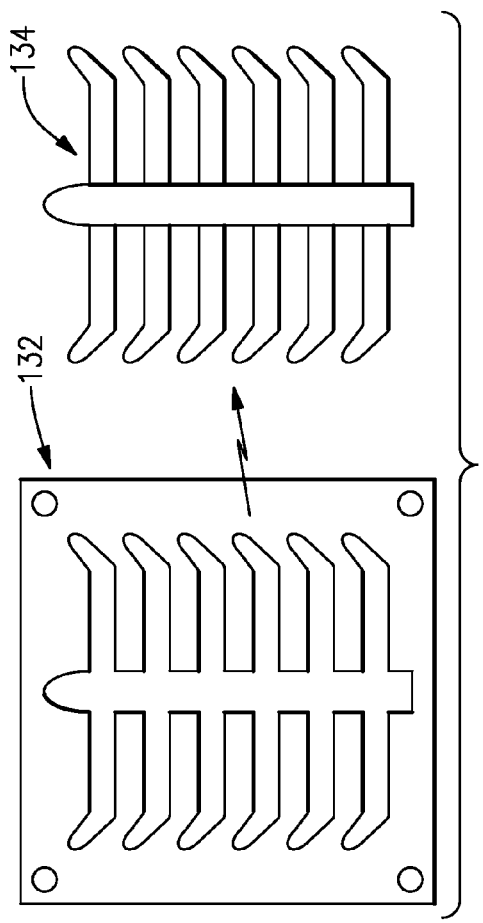
FIGS. 5A, 5B and 5C illustrate additional tooling and the corresponding casting articles that can be made by the illustrated tooling.
Figure 5C:
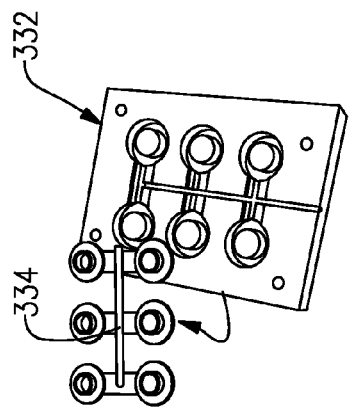
Figure 5B:
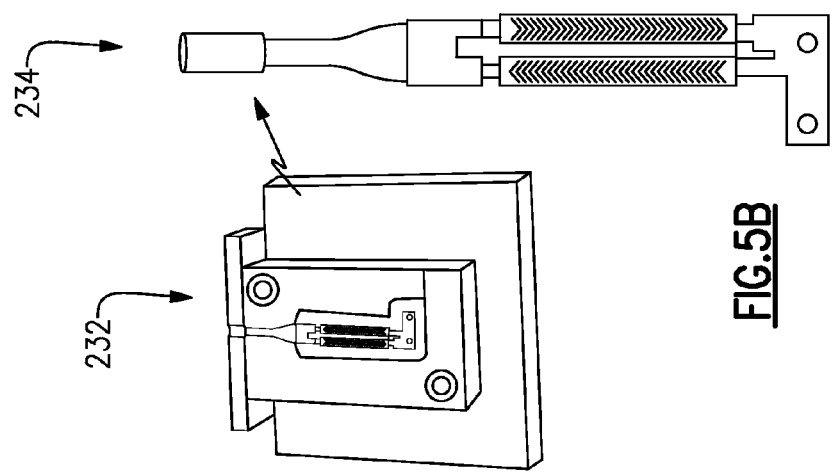

FIGS. 5A, 5B and 5C illustrate additional examples of tooling 132, 232, 332 that can be used to build a representative casting article 134, 234, 334, respectively. For example, the tooling 132 of FIG. 5A is die gating tooling that manufactures casting articles 134. The casting articles 134 of this example are die gating parts such as runners, risers, or other gating parts.

The tooling 232 of FIG. 5B is ceramic core tooling 232 that can be used to manufacture a casting article 234 such as a ceramic core for use in a casting process. The tooling 332 of FIG. 5C is a wax die tooling 332 that can be used to manufacture a casting article 334 such as a wax casting article for use in a casting process. Any tooling that can make any casting article could benefit from the various features of the example method described below in FIG. 6.

Figure 6:
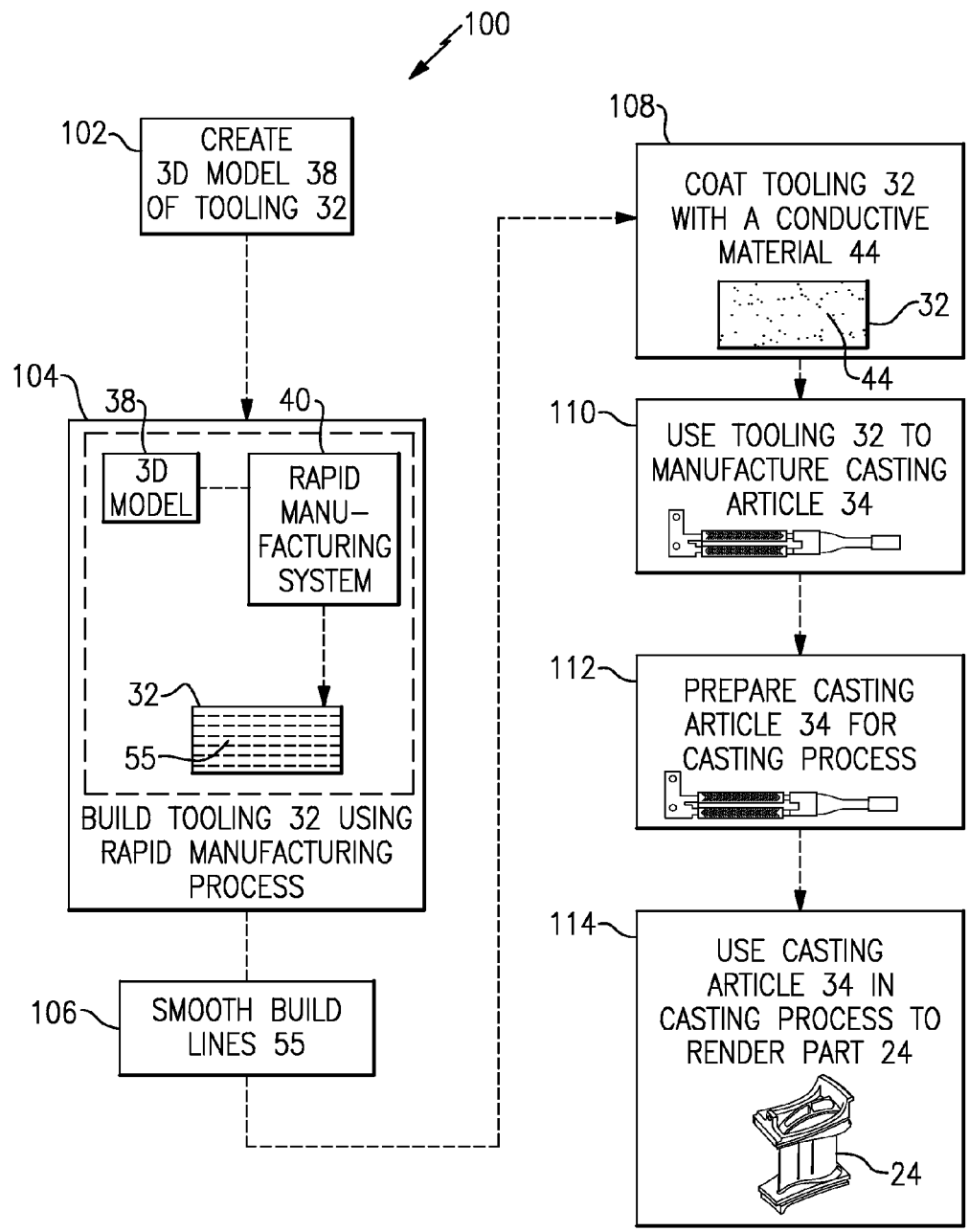
FIG. 6 schematically illustrates a rapid manufacturing method.

FIG. 6, with continued reference to FIGS. 1-4, schematically depicts a rapid manufacturing method 100. The exemplary method 100 begins at step block 102 where a 3D model 38 of the tooling 32 (or tooling 132, 232, 332) that is to be manufactured is created. The 3D model 38 can be made using known computer hardware and software. The 3D model 38 includes numerical data that defines the shape (including any internal surfaces) and any dimensional aspects of the tooling 32.

The tooling 32 is formed in a rapid manufacturing process using a polymeric material at step block 104. In this disclosure, the term "rapid manufacturing process" is intended to describe a process that can be performed in hours or days rather than weeks or months. In other words, finished tooling can be manufactured in a relatively short period of time according to the various features and advantages of this disclosure.

In one example, the tooling 32 is rapidly manufactured using a stereolithography (SLA) process. An SLA process utilizes a liquid plastic resin that is selectively cured with ultraviolet light in thin cross sections. The thin cross sections are formed layer-by-layer. In another example, the tooling 32 is built using a selective laser sintering (SLS) process. An SLS process utilizes powdered plastic materials that are selectively sintered by a laser layer-by-layer. Other rapid manufacturing processes may also be incorporated to rapidly manufacture the tooling 32.

The 3D model 38 is used to build the tooling 32. The 3D model 38 is communicated to a rapid manufacturing system 40 and provides the necessary numerical data for manufacturing the tooling 32. The 3D model 38 can be communicated to the rapid manufacturing system 40 in any known manner.

The tooling 32 can be made from a polymeric material. Example polymeric materials that can be used to build the tooling 32 include, but are not limited to, ultraviolet curable thermosets (e.g., epoxy, resin, urethane, cyanoacrylate, photopolymers, etc.) and powdered materials (e.g., nylon, glass filled nylon, polycarbonate, wax, metal, and sand bonded with heat cured resin). Other materials may also be suitable for forming the tooling 32. The tooling 32 is built to the dimensional opposite of a part to be cast in a casting process. In other words, the tooling 32 can be used to manufacture casting articles that define a shape corresponding to the shape of a desired casting, such as the desired shape of a gas turbine engine vane.

At step block 106, build lines 55 (i.e., rigid ripples formed on an outer surface of the tooling 32 during the rapid manufacturing process) of the tooling 32 can be smoothed prior to performing the coating processes of step block 108 (see below). In one example, the build lines 55 are smoothed by sanding an exterior surface of the tooling 32. The build lines 55 are smoothed to provide an improved coating surface for the tooling 32.

The tooling 32 manufactured during step block 104 is coated with a conductive material 44 at step block 108. For example, the tooling 32 can be coated with a metallic material that provides a desired degree of conductivity and durability. Example metallic coatings include copper based alloys, stainless steel based alloys, aluminum based alloys, nickel based alloys, gold based alloys, chromium based alloys, ferrous alloys and/or other suitable alloys and composites. The conductive nature of the metallic material conducts heat out of the tooling 32 to extend the operable life of the tooling 32.

The conductive material 44 can be applied using a variety of technologies, including but not limited to, cold spray coating and other suitable low temperature deposition processes such as kinetic energy metallization, kinetic metallization, kinetic spraying, high-velocity powder deposition, and cold gas-dynamic spray methods. Plating and sputtering techniques can also be employed to apply the conductive material 44.

Once built, the tooling 32 can be used to form a casting article 34 at step block 110. For example, a wax, a ceramic or other material can be injected into the tooling 32 to form the casting article 34. Casting articles 34 that can be formed can include any portion of a casting system, such as the casting system 26.

At step block 112, the casting article 34 built during step block 110 is prepared for use in a casting process, such as an investment casting process. For example, the casting article 34 can be assembled, coated with a refractory slurry, stuccoed, dewaxed and/or fired to prepare the casting article 34 for use in the casting process. Other operations can also be performed on the casting article 34 during step block 112.

Finally, at step block 114, the casting article 34 is used in a casting process to cast a part 24. For example, the casting article 34 can be used in the casting system 26 depicted by FIG. 3 to investment cast a gas turbine engine part 24, such as a turbine airfoil. The casting article 34 is evacuated during the casting process to render the part 24.

Figure 7:
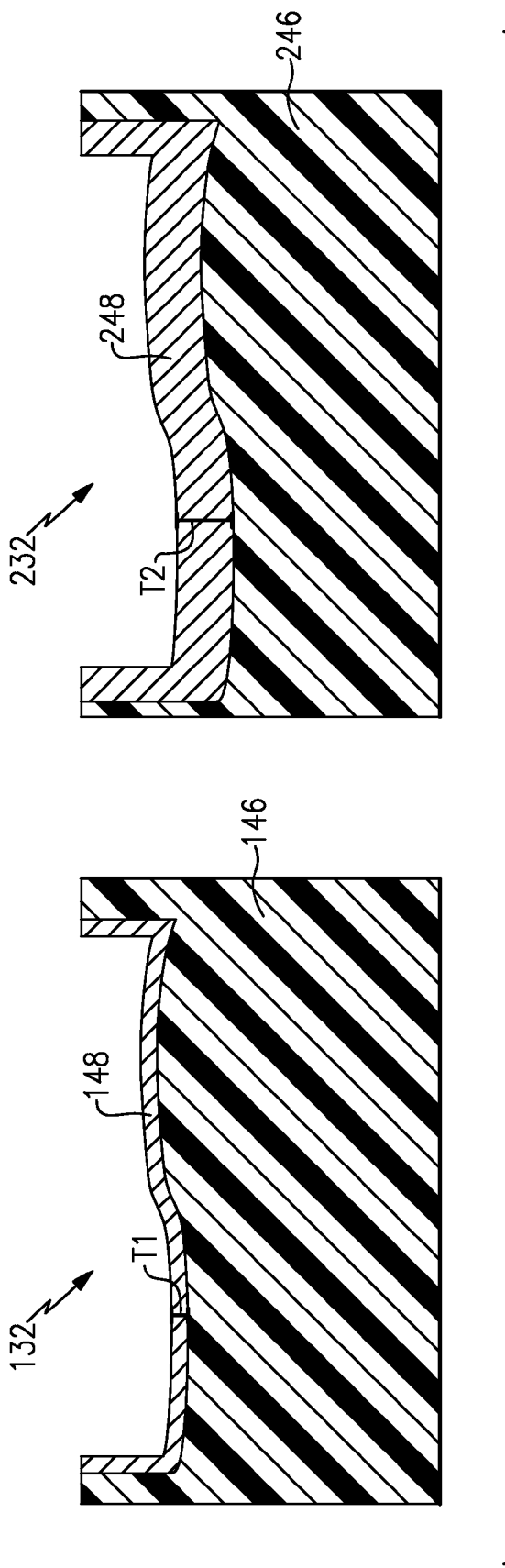
FIG. 7 illustrates tooling that can be used in performing the method of FIG. 5.

FIG. 7 illustrates additional examples of tooling 132, 232 that can be built and used according to the exemplary method 100 described above. In this example, the tooling 132, 232 is a die pattern for use in preparing a shell or core for use in the casting process. It should be understood that this disclosure extends to additional tooling, including but not limited to, die gating tooling and ceramic core tooling.

The example tooling 132 includes a mask 146 that can be rapidly manufactured, such as according to step block 104 detailed above. The mask 146 establishes an outer shell portion of the tooling 132. The mask 146 is backfilled with a relatively thin coating of metallic material 148 to provide a more robust structure for additional durability.

The example tooling 232 includes a mask 246 that can be rapidly manufactured, such as according to step block 104 described above. The mask 246 establishes an outer shell portion of the tooling 232. The mask 246 is backfilled with a relatively thick coating of metallic material 248 to provide a more robust structure for additional durability and improved conductivity characteristics. In this example, a thickness T1 of the metallic material 148 is less than a thickness T2 of the metallic material 248.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A rapid manufacturing method, comprising the steps of:
   (a) building tooling that includes a die pattern from a polymeric material using a rapid manufacturing process;
   (b) coating the tooling with a metallic material;
   (c) manufacturing a casting article with the tooling;
   (d) using the casting article in a casting process to cast a part; and
   (e) reusing the tooling to manufacture a second casting article.

2. The method as recited in claim 1, wherein the tooling is built to a dimensional opposite of the part cast in said step (d).

3. The method as recited in claim 1, wherein the rapid manufacturing process includes a stereolithography (SLA) process.

4. The method as recited in claim 1, wherein the rapid manufacturing process includes a selective laser sintering (SLS) process.

5. The method as recited in claim 1, wherein the polymeric material includes at least one of an ultraviolet curable thermoset and a powdered material.

6. The method as recited in claim 1, wherein the metallic material includes at least one of a copper based alloy, a stainless steel based alloy, an aluminum based alloy, a nickel based alloy, a gold based alloy, a chromium based alloy and a ferrous alloy.

7. The method as recited in claim 1, wherein the casting process includes an investment casting process.

8. The method as recited in claim 1, wherein the step of building includes:
rapidly manufacturing a mask of the tooling; and
backfilling the mask with a metallic material.

9. The method as recited in claim 1, wherein the step of coating includes the use of a coldspray coating process.

10. The method as recited as recited in claim 1, wherein the step of coating includes the use of a low temperature deposition process.

11. The method as recited as recited in claim 1, wherein the step of coating includes the use of a plating process.

12. The method as recited as recited in claim 1, wherein the step of coating includes the use of a sputtering process.

13. The method as recited as recited in claim 1, wherein the tooling includes die gating tooling.

14. The method as recited in claim 1, wherein the tooling includes a die for preparing a core.

15. The method as recited in claim 14, wherein the core is a ceramic core.

16. The method as recited in claim 1, wherein the tooling includes a die for preparing a shell.

\* \* \* \* \*